United States Patent [19]
Flotow

[11] 4,223,764
[45] Sep. 23, 1980

[54] DISK BRAKE ASSEMBLY
[75] Inventor: Richard A. Flotow, Fort Wayne, Ind.
[73] Assignee: Dana Corporation, Toledo, Ohio
[21] Appl. No.: 876,983
[22] Filed: Feb. 13, 1978
[51] Int. Cl.² .............................................. F16D 55/08
[52] U.S. Cl. ................................. 188/72.7; 188/72.3; 188/72.9
[58] Field of Search .................... 188/71.1, 72.1, 72.3, 188/72.4, 72.7, 72.9

[56] References Cited
U.S. PATENT DOCUMENTS

| | | | |
|---|---|---|---|
| 3,056,472 | 10/1962 | Bessler et al. | 188/72.3 |
| 3,499,508 | 3/1970 | Swift | 188/72.9 |
| 3,559,773 | 2/1971 | Hock | 188/72.1 |
| 4,042,073 | 8/1977 | Dickenson | 188/72.9 |

FOREIGN PATENT DOCUMENTS 1237451 3/1967 Fed. Rep. of Germany .......... 188/72.9

Primary Examiner—Edward R. Kazenske
Attorney, Agent, or Firm—Robert Leonardi

[57] ABSTRACT

A mechanically operated disk brake assembly is disclosed which incorporates an axially and rotationally moveable disk concentrically mounted to the axle of the vehicle. The disk is positioned between a fixed and a moveable brake plate. The moveable brake plate and the disk are pressed toward the fixed brake plate by a sliding cam when a braking lever is applied and are returned to the non-braking positioned when the braking lever is released.

6 Claims, 5 Drawing Figures

DISK BRAKE ASSEMBLY

The present invention relates to disk brakes for moving members such as wheeled vehicles, and more specifically to mechanically operated disk brake assemblies for garden tractors, motorcycles, snowmobiles, and the like.

Although many types of disk brake assemblies are presently known, they are often complex systems in which the rotor disk is rigidly mounted on the member to be braked and the braking action is effected by bringing lined pressure plates into frictional engagement with the faces of the disk. Such asemblies are often power assisted, for example hydraulically, in order to achieve the necessary braking force. However, for many uses, such assemblies are unnecessarily complicated, resulting in high manufacturing costs and difficulty in maintenance.

To relieve the grip of the brake pads, many prior art disk brakes relied on the rotational force of the disk itself. Thus, a considerable amount of additional wear results during the time gap between operator release of the brake lever and the freeing of the braking engagement between the pads and the disk. Additionally, a slight amount of wear continues even while the vehicle is in usage since the pressure plates never completely retract from the disk. The additional wear often lessens the useful life of the brake pads requiring relatively frequent replacement.

In other prior art assemblies using return springs to retract the plates, the springs resist the braking operation and thereby decrease its effectiveness. Such spring resistance is negligible with power-assisted brakes but is critical with prior art mechanically operated brake systems which are often inadequate in providing means for effectively overcoming such spring resistance and supplying sufficient braking force.

The present invention is a simple mechanically operated disk brake system which addresses and offers a solution to the above-described problems in the prior art. The assembly incorporates an axially and rotationally moveable disk concentrically mounted to a longitudinal moveable member, for example the axle of the vehicle, between opposing parallel fixed and moveable brake plates. The moveable brake plate and disk are pressed toward and against the fixed brake plate by a sliding progressive cam when a braking force is applied. Because the parallel orientation of the brake plates and the disk is maintained, uneven wear of the brake plates is minimized or eliminated. The moveable brake plate and the disk are retracted to their non-braking position by return springs when the braking force is released, thereby providing a drag-free disk brake assembly. The moveable brake plate and the disk are actuated by a sliding cam in engagement with an adjacent operating lever. The cam includes an elongated center line slot therethrough for retaining a pin and for maintaining the cam in sliding arrangement with the pin. In one embodiment, the cam also includes a cam surface which slopes away from the pin. The operating lever pivots at one end about the pin and includes a cam follower displaced from that end and radially moveable about the pin. When the lever is pivoted in one direction, the cam follower engages the gradually sloped cam surface and exerts a pushing force thereon whereby the cam slides relative to the center-line pin and presses the moveable brake plate and disk toward the fixed brake plate. In that manner, a strong and effective mechanically operated disk brake is achieved.

It is, therefore, an object of the present invention to provide a disk brake assembly which is drag-free between the brake plates and the disk.

It is further an object of the present invention to provide a mechanically operated disk brake assembly with an improved and effective power-to-braking-force ratio.

Other objects and advantages of the present invention will be obvious to those persons skilled in the art from the following description of a preferred embodiment.

FIG. 3 is a cross-sectional view along the line 3—3 in FIG. 1, illustrating the assembly in the braking position;

Figure 4:
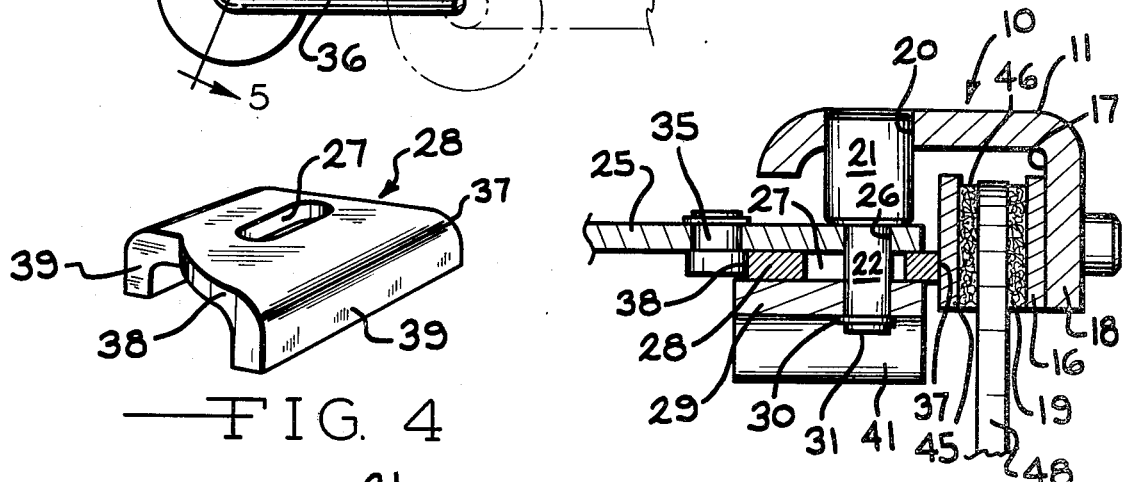
FIG. 4 is a perspective view of one embodiment of the actuation cam used in the disk brake assembly in accordance with the present invention.
Figure 2:
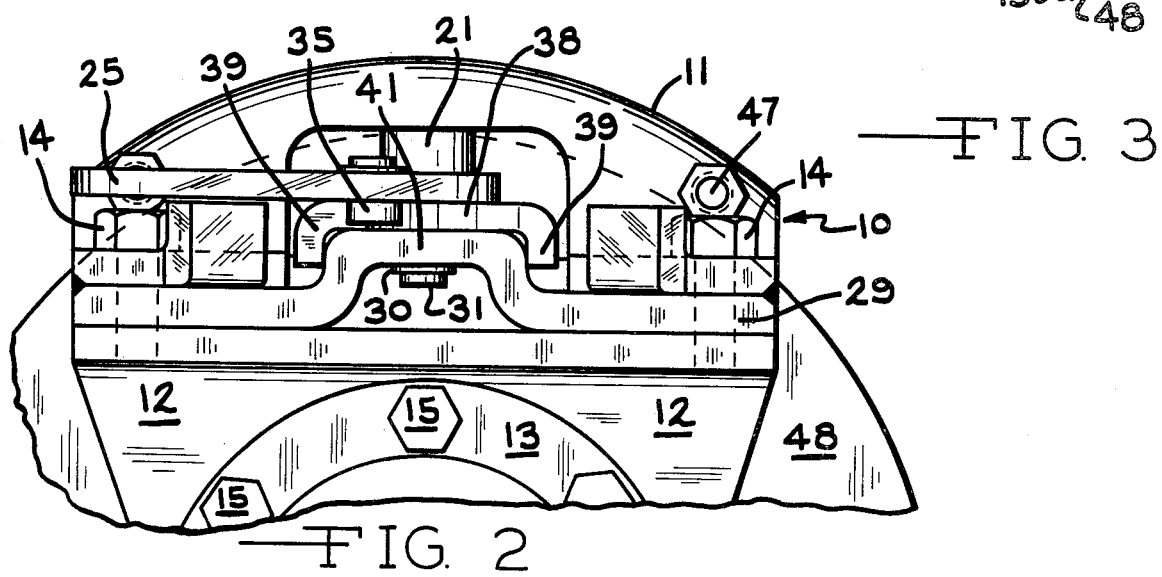
FIG. 2 is a partial side view of the disk brake assembly in FIG. 1.
Figure 5:
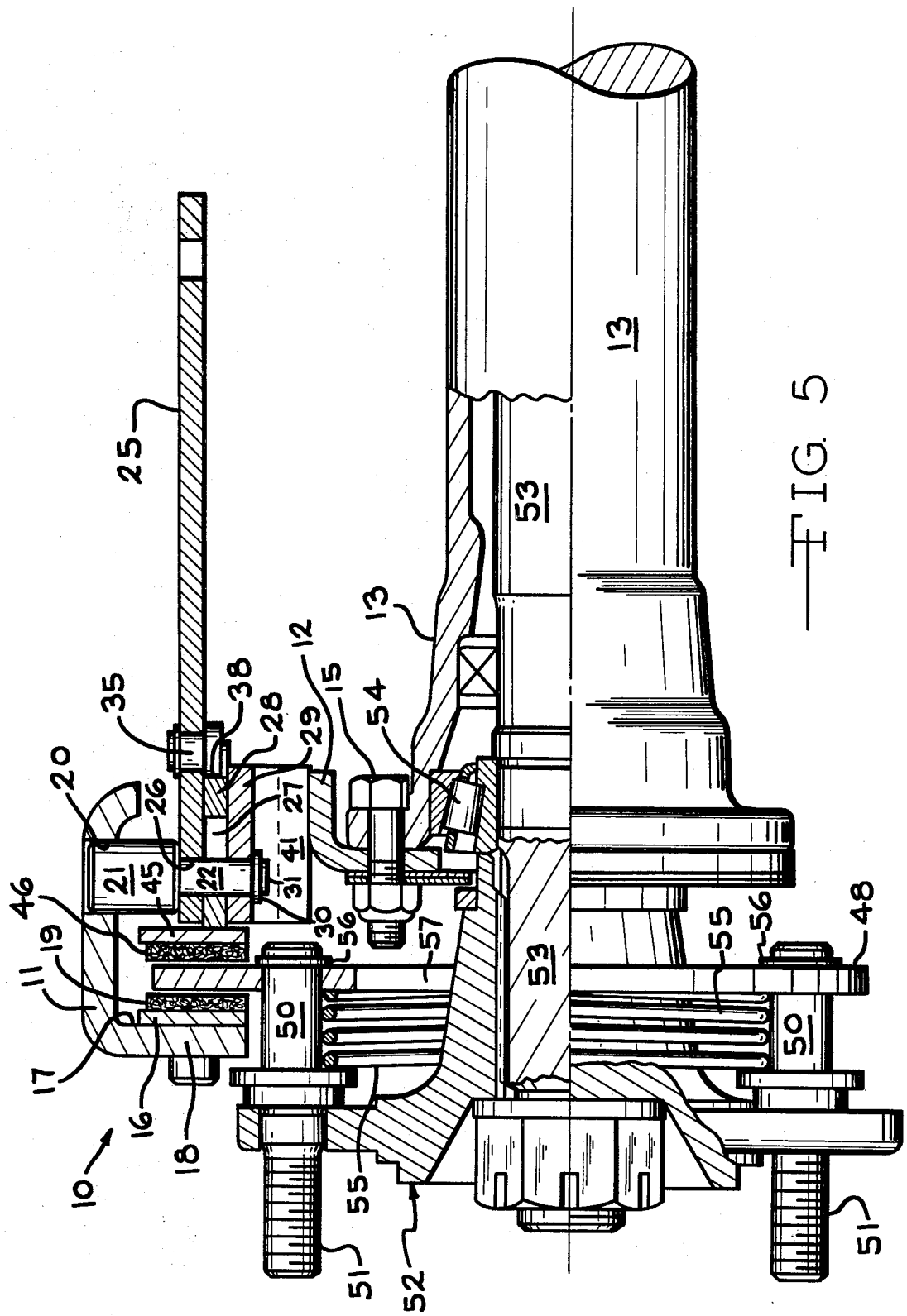
FIG. 5 is a broken-out section along the line 5—5 in FIG. 1, illustrating the disk brake assembly in the non-braking position.

FIGS. 1-3 and 5 relate to the same disk brake assembly in accordance with the present invention. The description below refers generally to those figures as a group and specific references to a figure will be made only where needed. FIG. 4 illustrates an actuation cam used in the brake assembly shown in the other figures.

The brake assembly, generally indicated by the numeral 10, includes a cover frame 11 and a base 12 which are fixed to each other and to an axle housing 13 by means of bolts 14 and 15 respectively. A pressure plate 16 is fixed to the inside surface 17 of an outer depending flange 18 of the cover frame 11 for securing a brake lining 19 in a fixed position relative to the axle housing 13. The cover frame 11 additionally includes a hole 20 through which is inserted and held a cylinder 21 and pin 22. The cylinder 21 rests upon and assists in securing an operating lever 25 from movement along the axis of the pin 22. The pin 22 passes through a pivot hole 26 in the operating lever 25, a slot 27 in an actuating member or cam 28, and a cam support 29. It is secured in position by means of a lock ring 30 at its lower end 31.

The operating lever 25 includes a cam follower 35, the pivot hole 26, and a linkage 36. In operation, the linkage 36 pivots the lever 25 in an arcuate path about the pin 22, as shown in phantom in FIG. 1, thereby effecting a camming action against the actuating cam 28 as discussed below.

The actuating cam 28, shown in detail in FIG. 4, is positioned immediately below the operating lever 25 and includes a forward flat pressing surface 37, a gradually sloped rear cam surface 38, guide flanges 39, and the directing slot 27. The cam 28 is positioned upon a guide rail portion 41 of the cam support 29 such that the guide flanges 39 are in sliding engagement therewith.

Figure 1:
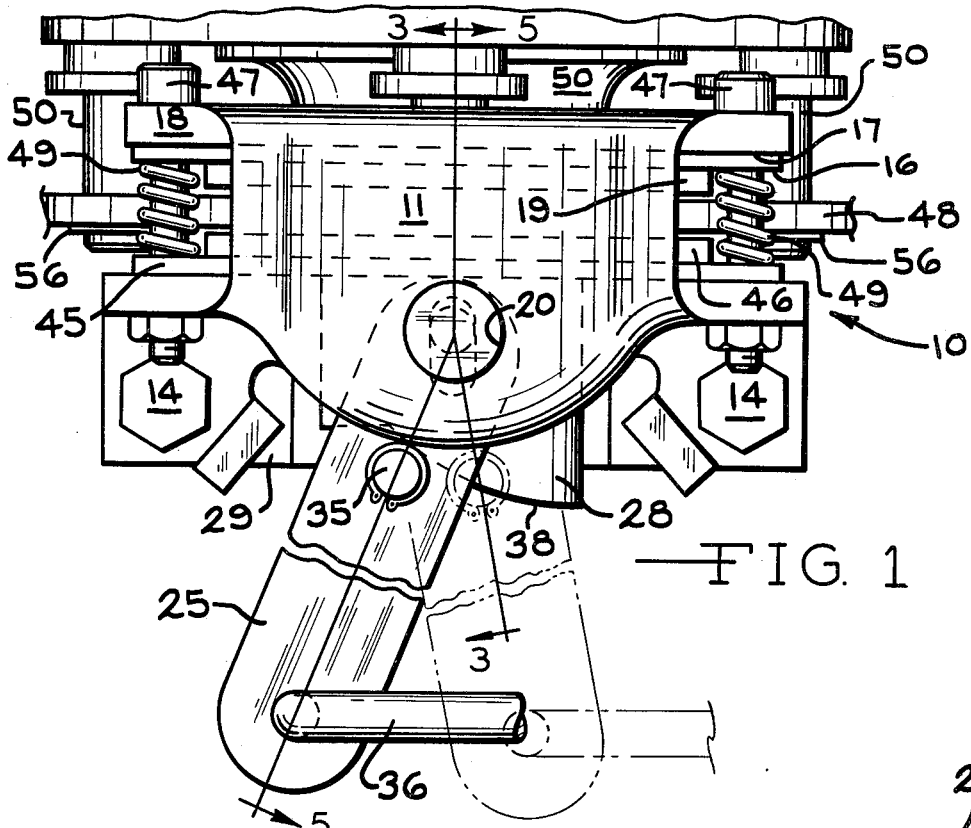
FIG. 1 is a top view of one embodiment of a disk brake assembly in accordance with the present invention.

When the linkage 36 pivots the lever 25, as discussed above, the cam follower 35 traverses the rear cam surface 38 from left to right, as shown in FIG. 1. The rear cam surface 38 gradually slopes from left to right, as shown in FIG. 1, away from the pin 22 so that, as the cam follower 35 pivots, the cam follower 35 exerts a force against the cam surface 38 and causes the cam 28 to slide along the guide rail portion 41 of the cam support 29. The pin moves along the directing slot 27. The cam follower 35 preferably rotates about its axis such that friction is minimized as it rolls up the inclined plane represented by the cam surface 38.

As the cam 28 slides forward, the flat pressing surface 37 pushes against a contiguous and moveable pressure plate 45 having a brake lining 46. The plate 45 lies in a plane parallel to the fixed pressure plate 16 and an intermediate rotor disk 48. The pressing surface 37 is preferably flat and covers a substantial area, as shown in the drawings, to assure a more uniform loading effect. The moveable pressure plate 45 travels along horizontal mounting bolts 47 until it contacts the rotor disk 48 which is both axially and rotationally moveable, as will be described below. Additional braking motion of the cam 28 forces the rotor disk 48 against the brake lining 19 of the fixed pressure plate 16. The disk 48 is thereby gripped between the plates, 16 and 45, and prevented from rotation. Upon release of the tractive force actuating the lever 25 and cam 28, the moveable pressure plate 45 is retracted away from the disk 48 and to its non-braking position by means of compression springs 49 positioned on the mounting bolts 47 between the plates 16 and 45. The rotor disk 48 is similarly returned to its original position, as discussed below.

The disk 48 is mounted upon slide rods 50, which are integral with studs 51. The studs 51 are part of a wheel assembly 52. The assembly 52 is splined to an axle 53 which rotably mounted by bearings 54 in the axle housing 13. The disk 48 is concentrically mounted with respect to the wheel assembly 52 and is urged to a non-braking position by a central compression spring 55. In the alternative (not shown), a plurality of individual compression springs which are mounted on the rods 50 may be utilized.

The central compression spring 55 urges the disk 48 into engagement with lock rings 56 mounted on the ends of rods 50. The disk 48 additionally includes a large central opening 57 circumscribing the wheel assembly 52, which allows the disk 48 to move freely along its axis when a braking force is applied. The spring 55 returns the disk 48 to its non-braking position when the actuating tractive force is released. The disk 48 rotates with the axle 53 or other moveable longitudinal member by means of the rotary force translated from the axle 53 through the splined wheel assembly 52 and the studs 53.

In an alternate mounting (not shown) for the disk on a wheel assembly which is substantially cylindrical in the area where the disk is mounted, the disk would have a plurality of splines circumjacently disposed about the central opening in the disk. These splines would mate with similar splines disposed about the periphery of the inboard end of the wheel assembly. The fit would, of course, need to be such as to allow free travel of the disk along its axis.

Problems of uneven brake lining wear are reduced by the brake system of the present invention which applies the pressure plates horizontally. The return springs 55 and 49 for the rotor disk 48 and the moveable pressure plate 45 enable the present invention assembly to be essentially drag-free by eliminating all contact between the brake linings and the disk when the brakes are not being applied. Further, the actuating cam mechanism of the present invention provides an efficient and powerful braking force which can be effectively applied often without the assistance of hydraulics or other power systems.

It should also be apparent that a variety of modifications can be made to the above-described embodiment. A variety of curved surfaces may be substituted for the rear cam surface described above and still provide a strong and effective braking force.

An alternate embodiment of the cam and follower arrangement would replace the rear cam surface 38 of the actuating cam or member 28 with a flat surface. The cam follower 35 would be removed from the operating lever 25 and mounted on the top flat surface of the actuating cam 28 rearward from the slot 27. The operating lever 25 would have a curved slot formed within it for engagement with the cam follower on the cam 28 by the camming slot and guided by the cam surface defined by the slot. As the lever 25 is actuated, the follower 35 traverses the slot, thereby urging the actuating cam or member 28 forward to brake the rotor disk 48 as previously described.

Still further, obvious expedients may be incorporated which provide power assistance in certain applications. Other modifications will be obvious to those persons skilled in the art without departing from the scope of the invention as defined in the following claims. The embodiments of the invention in which an exclusive property or privilege is claimed are defined as follows:

The embodiments of the invention in which an exclusive property or privilege is claimed are defined as follows:

1. A brake assembly for vehicles having a housed axle, said brake assembly including: an axially and rotationally movable disk concentrically mounted such that said disk revolves with the axle; a fixed brake plate and a movable brake plate opposingly mounted parallel to and on opposite sides of said disk and to the axle housing; releasable means for gradually moving said movable brake plate and said disk toward said fixed brake plate thereby pressing said disk between said brake plates and hindering rotational movement of said disk; said releasable means including a sliding actuating member and an adjacent releasable operating lever; guide means for said sliding actuating member, said guide means defining a center-line path perpendicular to said disk; said sliding actuating member having a pressing surface contiguous with said movable brake plate, an elongated center-line slot therethrough for insertion of a fixed pivot pin and for maintaining said actuating member in sliding engagement with said fixed pivot pin, and a cam surface on said actuating member opposed to said pressing surface, said cam surface being obliquely oriented relative to said pressing surface and gradually projecting away relative to said pressing surface; said operating lever being pivotally connected at one end to said fixed pivot pin and having a cylindrical pin cam follower displaced from said one end and rotationally movable about said fixed pivot pin, whereby said cam follower engages said cam surface and exerts a substantially center-line pushing force thereon when said lever pivots in one direction thereby progressively sliding said actuating member along such center-line perpendicular path relative to said fixed pivot pin such that said pressing surface progressively moves said movable brake plate and said disk toward said fixed brake plate; at least one return spring between said brake plates for retracting said movable brake plate away from said fixed brake plate when said operating lever is released; at least one return spring between said disk and said fixed brake plate for retracting said disk away from said fixed brake plate when said operating lever is released.

2. A disk brake assembly for a rotatable member comprising a disk mounted for rotation with said member, a first brake plate mounted on one side of said disk, a second movable brake plate mounted on the other side of said disk, cam means for applying a substantially center-line force to said movable brake plate and thereby urging both said movable brake plate and said disk into a locking relationship with said first brake plate, said cam means including an actuating member having a pressing surface and a cam surface opposite said pressing surface and spaced from said pressing surface, said cam surface being obliquely oriented relative to said pressing surface and gradually projecting away relative to said pressing surface, guide means defining a center-line path perpendicular to said disk, and a lever having a cam follower member projecting therefrom and adjacent said cam surface, said pressing surface being contiguous with said movable brake plate, said actuating member being positioned for center-line movement along said guide means, wherein movement of said lever urges said cam follower member against said cam surface, said cam follower member moving along said gradually projecting cam surface, thereby progressively moving said actuating member along such perpendicular guided path and moving said pressing surface against said movable brake plate to progressively apply a center-line force and return means for urging said disk and said movable brake plate into a non-locking position.

3. A vehicle brake assembly as defined in claim 2, said cam follower member being a substantially cylindrical pin integral with said lever.

4. A disk brake assembly, according to claim 1, wherein said guide means includes guide rails complementary with said actuating member, said guide rails preventing movement of said actuation member in any direction except along such perpendicular, center-line path.

5. A disk brake assembly, according to claim 1, wherein said first brake plate is fixed.

6. A disk brake assembly, according to claim 1, wherein return means comprises spring means.

* * * * *